(12) United States Patent
Sun et al.

(10) Patent No.: US 10,771,216 B2
(45) Date of Patent: Sep. 8, 2020

(54) SOUNDING REFERENCE SIGNAL SENDING METHOD AND USER EQUIPMENT

(71) Applicant: HUAWEI TECHNOLOGIES CO., LTD., Shenzhen (CN)

(72) Inventors: Xiaodong Sun, Shenzhen (CN); Jian Wang, Beijing (CN); Richard Stirling-Gallacher, Munich (DE); Chen Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/335,684

(22) PCT Filed: Sep. 22, 2016

(86) PCT No.: PCT/CN2016/099729
§ 371 (c)(1),
(2) Date: Mar. 22, 2019

(87) PCT Pub. No.: WO2018/053755
PCT Pub. Date: Mar. 29, 2018

(65) Prior Publication Data
US 2020/0036492 A1    Jan. 30, 2020

(51) Int. Cl.
*H04W 4/00* (2018.01)
*H04L 5/00* (2006.01)
(Continued)

(52) U.S. Cl.
CPC ............. *H04L 5/0048* (2013.01); *H04L 5/14* (2013.01); *H04W 52/242* (2013.01); *H04W 52/367* (2013.01); *H04W 52/42* (2013.01)

(58) Field of Classification Search
CPC ...... H04L 5/0048; H04L 5/14; H04W 52/242; H04W 52/367; H04W 52/42
(Continued)

(56) References Cited

U.S. PATENT DOCUMENTS

2011/0058505 A1    3/2011   Pan et al.
2011/0249648 A1   10/2011   Jen
(Continued)

FOREIGN PATENT DOCUMENTS

CN    101572896 A    11/2009
CN    102427608 A     4/2012
(Continued)

OTHER PUBLICATIONS

R1-155676 Ericsson,"SRS design for FD-MIMO",3GPP TSG-RAN WG1#82bis,Malmö, Sweden, Oct. 5-9, 2015,total 2 pages.
(Continued)

*Primary Examiner* — Thai D Hoang
(74) *Attorney, Agent, or Firm* — Kilpatrick Townsend & Stockton LLP

(57) ABSTRACT

A sounding reference signal sending method and user equipment are disclosed. The method includes the following steps: receiving a configuration parameter of a sounding reference signal SRS, and determining, based on the configuration parameter, a time-frequency resource occupied by the SRS, where the configuration parameter includes a trigger type, a period parameter, and a time-frequency resource location identifier; obtaining a power control parameter of the SRS, and calculating, based on the power control parameter and a preset calculation formula, a transmit power for sending the SRS; and sending the SRS on the time-frequency resource at the transmit power. The trigger type includes beamforming and non-beamforming. The period parameter is an identifier used to indicate that the SRS is sent periodically or aperiodically.

20 Claims, 6 Drawing Sheets

(51) Int. Cl.
*H04L 5/14* (2006.01)
*H04W 52/24* (2009.01)
*H04W 52/36* (2009.01)
*H04W 52/42* (2009.01)

(58) Field of Classification Search
USPC .......... 370/329–330, 335–345, 347–348
See application file for complete search history.

(56) References Cited

U.S. PATENT DOCUMENTS

| | | | |
|---|---|---|---|
| 2014/0146777 | A1 | 5/2014 | Shin et al. |
| 2017/0033856 | A1 | 2/2017 | Su et al. |
| 2017/0150482 | A1 | 5/2017 | Chen et al. |
| 2018/0343046 | A1* | 11/2018 | Park .................... H04B 7/0626 |
| 2019/0253949 | A1* | 8/2019 | Park .................... H04W 36/305 |
| 2020/0076554 | A1* | 3/2020 | Dou .................... H04W 72/042 |

FOREIGN PATENT DOCUMENTS

| | | |
|---|---|---|
| CN | 103036663 A | 4/2013 |
| CN | 103096449 A | 5/2013 |
| CN | 104604170 A | 5/2015 |
| CN | 104737489 A | 6/2015 |
| CN | 105007126 A | 10/2015 |
| EP | 2579490 A2 | 4/2013 |
| EP | 2765816 A1 | 8/2014 |
| EP | 3145095 A1 | 3/2017 |

OTHER PUBLICATIONS

3GPP TS 36.213 V13.2.0 (Jun. 2016),3rd Generation Partnership Project;Technical Specification Group Radio Access Network;Evoived Universal Terrestrial Radio Access (E-UTRA);Physical layer procedures(Release 13),total 381 pages.

3GPP TS 36.211 V13.2.0 (Jun. 2016),3rd Generation Partnership Project;Technical Specification Group Radio Access Network;Evolved Universal Terrestrial Radio Access (E-UTRA);Physical channels and modulation(Release 13),total 168 pages.

3GPP TS 36.331 V13.2.0 (Jun. 2016),3rd Generation Partnership Project;Technicai Specification Group Radio Access Network;Evolved Universal Terrestrial Radio Access (E-UTRA);Radio Resource Control (RRC);Protocol specification (Release 13),total 623 pages.

R1-167224 Huawei et al., "Principles for Reference Signal Design and QCL Assumptions for NR", 3GPP TSG RAN WG1 Meeting #86, Gothenburg, Sweden, Aug. 22-26, 2016, total 9 pages.

R1-167222 Huawei et al., "Discussion on Channel Multiplexing of RS for High Frequency", 3GPP TSG RAN WG1 Meeting #86, Gothenburg, Sweden, Aug. 22-26, 2016, total 2 pages.

* cited by examiner

SOUNDING REFERENCE SIGNAL SENDING METHOD AND USER EQUIPMENT

CROSS-REFERENCE TO RELATED APPLICATIONS

This application is a National Stage of International Application No. PCT/CN2016/099729, filed on Sep. 22, 2016, which is hereby incorporated by reference in its entirety.

TECHNICAL FIELD

The present disclosure relates to the field of communications technologies, and in particular, to a sounding reference signal sending method and user equipment.

BACKGROUND

In a wireless communications system, in addition to a data signal, some known reference signals usually also need to be sent between user equipment and a base station, for example, a sounding reference signal (SRS), and are used for estimation of a radio channel status. The SRS is sent by the user equipment (UE) to the base station. The base station estimates an uplink channel status by using the received SRS, to perform resource scheduling based on the uplink channel status. In a time division duplex (TDD) system, because uplink and downlink channels have reciprocity, the SRS may further be used for estimation and measurement of a downlink channel.

In the prior art, an SRS may be sent in a periodic or aperiodic manner, and non-beamforming omnidirectional sending is used. Due to the omnidirectional sending, a base station of a surrounding cell may detect the sent SRS through listening. Consequently, interference to a neighboring cell is easily caused, and effectiveness of sending the SRS is reduced.

SUMMARY

Embodiments of the present disclosure provide a sounding reference signal sending method and user equipment, and a beamformed SRS is used, so that a coverage distance of the SRS is increased, and interference to a neighboring cell is reduced, thereby improving effectiveness of sending the SRS.

According to a first aspect, an embodiment of the present disclosure provides a sounding reference signal sending method, including:
  receiving a configuration parameter of a sounding reference signal SRS from a base station, and determining, based on the configuration parameter, a time-frequency resource occupied by the SRS, where the configuration parameter includes a trigger type, a period parameter, and a time-frequency resource location identifier; the trigger type includes beamforming or non-beamforming; and the period parameter is an identifier used to indicate that the SRS is sent periodically or aperiodically;
  obtaining a power control parameter of the SRS, and calculating, based on the power control parameter and a preset calculation formula, a transmit power for sending the SRS; and
  sending the SRS on the time-frequency resource at the transmit power.

According to the first aspect of the embodiments of the present disclosure, a beamformed SRS may be sent. Compared with a non-beamformed SRS, the beamformed SRS can increase a coverage distance of the SRS, and reduce interference to a neighboring cell, thereby improving effectiveness of sending the SRS.

With reference to the first aspect, in a first implementation of the first aspect, user equipment may receive configuration parameters of a plurality of SRSs, for example, receive configuration parameters of two SRSs, and the SRSs include a first SRS and a second SRS. Correspondingly, a configuration parameter of the first SRS is a first configuration parameter, and a configuration parameter of the second SRS is a second configuration parameter. Based on the step of calculating, based on the power control parameter and a preset calculation formula, a transmit power for sending the SRS in the first aspect, the user equipment determines that a transmit power of the first SRS is a first transmit power, and a transmit power of the second SRS is a second transmit power.

With reference to the first implementation of the first aspect, in a second implementation of the first aspect, if the first configuration parameter of the first SRS and the second configuration parameter of the second SRS are received, the sending the SRS on the time-frequency resource at the transmit power includes:
  if the first SRS and the second SRS occupy a same time-frequency resource, according to a preset priority rule, sending the first SRS at the first transmit power or sending the second SRS at the second transmit power; or
  if the first SRS and the second SRS occupy different time-frequency resources, sending the first SRS at the first transmit power and sending the second SRS at the second transmit power.

Optionally, the user equipment may define the preset priority rule. For example, a priority of an SRS of any trigger type that is aperiodically sent is higher than a priority of an SRS of any trigger type that is periodically sent; a priority of a beamformed SRS that is periodically sent is higher than a priority of a non-beamformed SRS that is periodically sent; and a priority of a beamformed SRS that is aperiodically sent is higher than a priority of a non-beamformed SRS that is aperiodically sent.

With reference to the first implementation of the first aspect, in a third implementation of the first aspect, if the first configuration parameter of the first SRS and the second configuration parameter of the second SRS are received, when the first SRS is a beamformed SRS that is periodically sent, and the second SRS is a beamformed SRS that is aperiodically sent, the sending the SRS on the time-frequency resource at the transmit power includes:
  if the first SRS and the second SRS occupy a same time-frequency resource, sending the second SRS on the same occupied time-frequency resource at the second transmit power; or
  if the first SRS and the second SRS occupy different time-frequency resources, sending the first SRS at the first transmit power and sending the second SRS at the second transmit power.

With reference to the first implementation of the first aspect, in a fourth implementation of the first aspect, if the first configuration parameter of the first SRS and the second configuration parameter of the second SRS are received, when the first SRS is a beamformed SRS that is periodically sent, the second SRS is a non-beamformed SRS that is periodically sent, and the second SRS and the first SRS have a same period, the sending the SRS on the time-frequency resource at the transmit power includes:

if the first SRS and the second SRS occupy a same time-frequency resource, dividing the same time-frequency resource into a first same time-frequency resource and a second same time-frequency resource, sending the first SRS on the first same time-frequency resource at the first transmit power, and sending the second SRS on the second same time-frequency resource at the second transmit power; or sending the first SRS on the same time-frequency resource at the first transmit power; or if the first SRS and the second SRS occupy different time-frequency resources, sending the first SRS at the first transmit power and sending the second SRS at the second transmit power.

With reference to the first implementation of the first aspect, in a fifth implementation of the first aspect, if the first configuration parameter of the first SRS and the second configuration parameter of the second SRS are received, when the first SRS is a beamformed SRS that is periodically sent, the second SRS is a non-beamformed SRS that is periodically sent, and the second SRS and the first SRS have different periods, the sending the SRS on the time-frequency resource at the transmit power includes:

if the first SRS and the second SRS occupy a same time-frequency resource, sending the first SRS on the same occupied time-frequency resource at the first transmit power; or if the first SRS and the second SRS occupy different time-frequency resources, sending the first SRS at the first transmit power and sending the second SRS at the second transmit power.

With reference to the first aspect, the first implementation of the first aspect, the second implementation of the first aspect, the third implementation of the first aspect, the fourth implementation of the first aspect, or the fifth implementation of the first aspect, in a sixth implementation of the first aspect, the power control parameter includes a power offset value of a non-beamformed SRS, a quantity of occupied resource blocks, a power adjustment value, a path loss compensation factor, an expected receive power, and a power gain, and the power gain is used to calculate, based on the power offset value of the non-beamformed SRS, a power offset value of an SRS whose trigger type is beamforming.

Optionally, the preset calculation formula is:

$$P_{SRS} = \min\{P_{CMAX}, P_{SRS\_OFFSET}(m) + 10\log_{10}(M_{SRS}) + P_O + \alpha \cdot PL + f\},$$

where $P_{SRS}$ is the transmit power for sending the SRS; $P_{CMAX}$ is a preset maximum transmit power in user equipment; $P_{SRS\_OFFSET}(m)$ is a power offset, and values of m are 0, 1, 2, and 3; $M_{SRS}$ is the quantity of resource blocks occupied for sending the SRS; $P_O$ is the expected receive power; $\alpha$ is the path loss compensation factor; PL is a path loss estimated by the user equipment; and f is the power adjustment value;

$P_{SRS\_OFFSET}(0)$ is a power offset of a non-beamformed SRS that is periodically sent; $P_{SRS\_OFFSET}(1)$ is a power offset of a non-beamformed SRS that is aperiodically sent; $P_{SRS\_OFFSET}(2)$ is a power offset of a beamformed SRS that is periodically sent; and $P_{SRS\_OFFSET}(3)$ is a power offset of a beamformed SRS that is aperiodically sent; and calculation manners of $P_{SRS\_OFFSET}(2)$ and $P_{SRS\_OFFSET}(3)$ are:

$$P_{SRS\_OFFSET}(2) = P_{SRS\_OFFSET}(0) - pBF\_SRS\_Gain,$$

$$P_{SRS\_OFFSET}(3) = P_{SRS\_OFFSET}(1) - pBF\_SRS\_GainAp,$$

where pBF_SRS_Gain is a gain of the beamformed SRS that is periodically sent relative to the non-beamformed SRS that is periodically sent; and pBF_SRS_GainAp is a gain of the beamformed SRS that is aperiodically sent relative to the non-beamformed SRS that is aperiodically sent.

According to a second aspect, an embodiment of the present disclosure provides user equipment, including:

a receiving unit, configured to: receive a configuration parameter of a sounding reference signal SRS from a base station, and determine, based on the configuration parameter, a time-frequency resource occupied by the SRS, where the configuration parameter includes a trigger type, a period parameter, and a time-frequency resource location identifier;

an obtaining unit, configured to: obtain a power control parameter of the SRS, and calculate, based on the power control parameter and a preset calculation formula, a transmit power for sending the SRS; and a sending unit, configured to send the SRS on the time-frequency resource at the transmit power, where the trigger type includes beamforming or non-beamforming; the period parameter is an identifier used to indicate that the SRS is sent periodically or aperiodically.

Optionally, the SRS includes a first SRS and a second SRS; a configuration parameter of the first SRS is a first configuration parameter, a configuration parameter of the second SRS is a second configuration parameter, a transmit power of the first SRS is a first transmit power, and a transmit power of the second SRS is a second transmit power.

The user equipment provided in the second aspect of the embodiments of the present disclosure is configured to perform the sounding reference signal sending method according to the first aspect of the present disclosure. Refer to the descriptions of the first aspect of the embodiments of the present disclosure for details. Details are not described herein again.

In a possible design, a structure of the user equipment includes a processor and a transceiver, and the processor is configured to perform the sounding reference signal sending method according to the first aspect of the present invention. Optionally, the user equipment may further include a memory. The memory is configured to store application program code supporting the user equipment in performing the foregoing method. The processor is configured to execute the application program stored in the memory.

According to a third aspect, an embodiment of the present disclosure provides a computer storage medium, configured to store a computer software instruction used by the foregoing user equipment. The computer software instruction includes a program designed to perform the foregoing aspects.

In the embodiments of the present disclosure, a name of the base station or the user equipment does not constitute a limitation on the device itself. During actual implementation, these devices may have other names, provided that functions of the devices are similar to those in the present disclosure and fall within the scope defined by the claims and equivalent technologies of the present disclosure.

In the embodiments of the present disclosure, the user equipment receives the configuration parameter of the SRS that is sent by the base station and includes the trigger type, the period parameter, and the time-frequency resource location identifier, and determines, based on the configuration parameter, the time-frequency resource occupied by the SRS; then obtains the power control parameter of the SRS, and calculates, based on the power control parameter and the preset calculation formula, the transmit power for sending the SRS; and finally sends the SRS on the time-frequency resource at the transmit power. The trigger type includes beamforming and non-beamforming, and the SRS may be sent periodically or aperiodically. Compared with the non-beamformed SRS, the beamformed SRS can increase a coverage distance of the SRS, and reduce interference to a neighboring cell, thereby improving effectiveness of sending the SRS.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
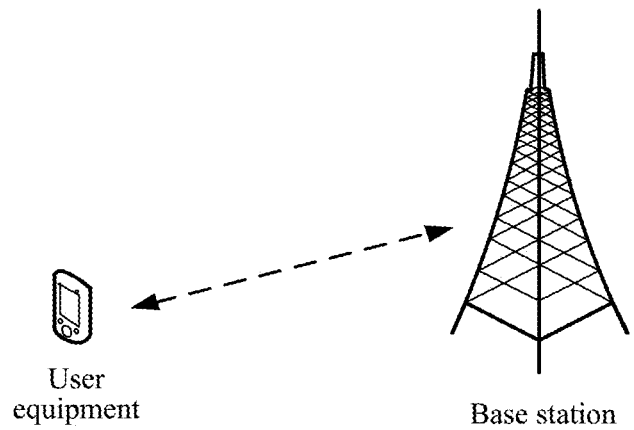
FIG. 1 shows a possible network architecture according to an embodiment of the present disclosure.

In the solutions provided in the present disclosure, a beamformed SRS is used, so that a coverage distance of the SRS is increased, and interference to a neighboring cell is reduced, thereby improving effectiveness of sending the SRS.

To make a person skilled in the art understand the technical solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall in the protection scope of the present disclosure.

In the specification, claims, and accompanying drawings of the present invention, the terms "first", "second", "third", "fourth", and so on are intended to distinguish different objects but do not indicate a particular order. Moreover, the terms "including", "including", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiments" mentioned in the specification indicates that a particular characteristic, structure or property that is related to the embodiment may be included in at least one embodiment of the present disclosure. The phase occurred at different locations in the specification does not necessarily refer to a same embodiment, or an independent or alternate embodiment exclusive of another embodiment. A person skilled in the art understands, in explicit and implicit manners, that an embodiment described in this application may be combined with another embodiment.

To facilitate understanding the present invention, the following first describes a possible network architectural diagram applicable to the embodiments of the present disclosure. The network architecture shown in FIG. 1 may include a base station and user equipment located in a coverage of the base station. The base station may trigger the user equipment to send an SRS. For example, in a Long Term Evolution (Long Term Evolution, LTE) system, an SRS sending method specified in LTE is: a last SC_FDMA symbol in each uplink subframe having a length of 1 ms may be used to send the SRS. Each UE may select different bandwidths to send the SRS. In a selected bandwidth, the user equipment sends the SRS in a comb-like spectrum (comb-like spectrum) manner, that is, places an SRS symbol at fixed intervals of every two subcarriers. In the prior art, an SRS may be sent in a periodic or aperiodic manner, and non-beamforming omnidirectional sending is used. Due to the omnidirectional sending, a base station of a surrounding cell may detect the sent SRS through listening. Consequently, interference to a neighboring cell is easily caused.

In the embodiments of the present disclosure, a beamformed SRS is sent. Because the SRS is sent in a directional manner, interference among cells can be reduced. For example, a configuration parameter, sent by abase station, of a sounding reference signal SRS is received, and a time-frequency resource occupied by the SRS is determined based on the configuration parameter, where the configuration parameter includes a trigger type, a period parameter, and a time-frequency resource location identifier; a power control parameter of the SRS is obtained, and a transmit power for sending the SRS is calculated based on the power control parameter and a preset calculation formula; and the SRS is sent on the time-frequency resource at the transmit power. The trigger type includes beamforming and non-beamforming. The period parameter is an identifier used to indicate that the SRS is sent periodically or aperiodically. In this way, effectiveness of sending the SRS can be improved.

The embodiments of the present disclosure may be applied to other communications systems that support sending a sounding reference signal, for example, an evolved packet system (EPS), a Global System for Mobile Communications (GSM) system, a Code Division Multiple Access (CDMA) system, a Wideband Code Division Multiple Access , (WCDMA) system, a General Packet Radio Service (GPRS), an LTE Frequency Division Duplex (FDD) system, and LTE Time Division Duplex (TDD).

In the embodiments of the present disclosure, the user equipment may include, but is not limited to, a terminal (Terminal), a mobile station (MS), or the like, and may alternatively be a mobile phone (which is alternatively referred to as a "cellular" phone), or may be a portable, pocket-sized, handheld, built-in, or in-vehicle mobile apparatus (a smart band, a smart watch, smart glasses, or the like).

Based on the network architecture shown in FIG. 1, the base station and the user equipment in the embodiments of the present disclosure may have other names, provided that functions of the devices are similar to those in the present disclosure and fall within the scope defined by the claims and equivalent technologies of the present disclosure.

Figure 2:
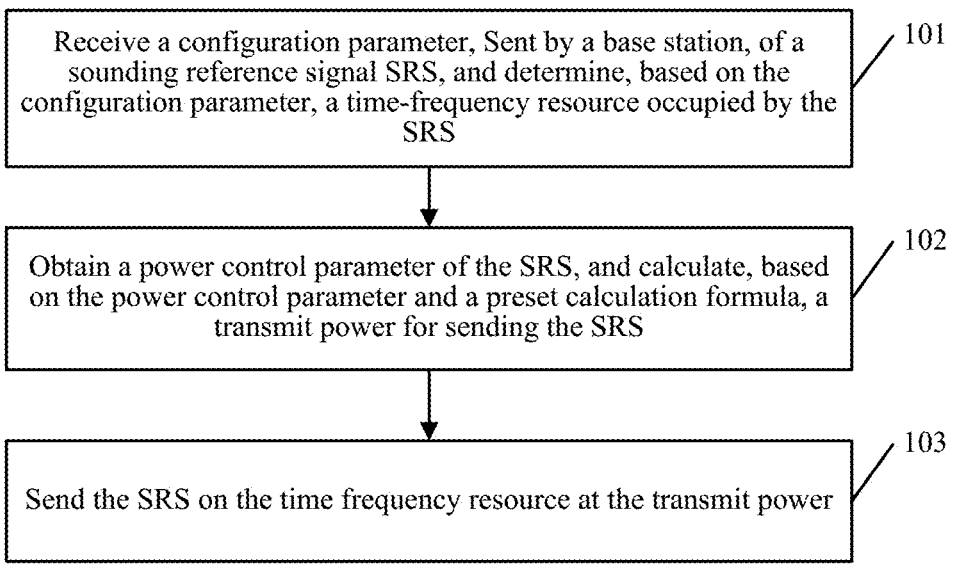
FIG. 2 is a schematic flowchart of a sounding reference signal sending method according to an embodiment of the present disclosure.

FIG. 2 is a schematic flowchart of a sounding reference signal sending method according to an embodiment of the present disclosure. As shown in FIG. 2, the sounding reference signal sending method in this embodiment of the present disclosure includes step 101 to step 103. The sounding reference signal sending method in this embodiment of the present disclosure is performed by user equipment. Refer to the following detailed descriptions for a specific process.

101. Receive a configuration parameter, sent by a base station, of a sounding reference signal SRS, and determine, based on the configuration parameter, a time-frequency resource occupied by the SRS, where the configuration parameter includes a trigger type, a period parameter, and a time-frequency resource location identifier.

Specifically, the user equipment receives the configuration parameter of the SRS that is sent by the base station, and determines, based on the configuration parameter, the time-frequency resource occupied by the SRS. The configuration parameter includes the trigger type, the period parameter, and the time-frequency resource location identifier.

The trigger type includes beamforming or non-beamforming. The beamforming is a signal preprocessing technology based on an antenna array. In the beamforming, a directional beam is generated by adjusting a weighting coefficient of each array element in the antenna array. A beamformed SRS sent by the user equipment is an SRS that is sent in a preset direction. For example, the user equipment sends an SRS toward a location of the base station. A non-beamformed SRS sent by the user equipment is an SRS sent in an omnidirectional manner. It may be conceivable that for the SRSs sent by using a same transmit power, a coverage distance of the beamformed SRS is greater than a coverage distance of the non-beamformed SRS. Further, when the user equipment sends the non-beamformed SRS to a base station of a current cell, because the SRS is sent in an omnidirectional manner, a base station of a surrounding cell may detect the sent SRS through listening, easily causing interference to a neighboring cell. If the beamformed SRS is sent, because the SRS is sent in a directional manner, interference to a neighboring cell can be greatly reduced.

The period parameter is an identifier used to indicate that the SRS is sent periodically or aperiodically. In a feasible solution, the identifier may be a field that is jointly agreed on by the base station and the user equipment and that is used to indicate periodic sending or aperiodic sending. For example, when the period parameter is "true", it indicates periodic sending of the SRS; and when the period parameter is "false", it indicates aperiodic sending of the SRS. For another example, when the period parameter is "0000", it indicates aperiodic sending of the SRS; and when the period parameter is "0001", it indicates periodic sending of the SRS, and "0001" may be used to determine a period of the periodic sending. A value corresponding to the field may be determined as the period, or a value having a mapping relationship with the field may be determined as the period. In another feasible solution, the identifier may be signaling that is jointly agreed on by the base station and the user equipment and that is used to indicate periodic sending or aperiodic sending. For example, if the signaling is higher layer signaling, for example, Radio Resource Control (Radio Resource Control, RRC) signaling, it indicates periodic sending, and a period is added to the configuration parameter and is used to instruct the user equipment to send the SRS based on the period; and if the signaling is physical layer signaling, for example, signaling in a format of downlink control information (Downlink Control Information, DCI), it indicates aperiodic sending. The foregoing descriptions are only examples for description. A possible implementation of the period parameter is not limited in this embodiment of the present disclosure.

The time-frequency resource location identifier is used to determine the time-frequency resource occupied for sending the SRS. Optionally, the time-frequency resource location identifier may include a frequency domain starting location, a frequency domain offset, a frequency domain occupied bandwidth, a time domain starting subframe (or a symbol identifier), and a time domain offset. The time domain starting subframe (or the symbol identifier) and the time domain offset are used to indicate a time domain location, and the frequency domain starting location, the frequency domain offset, and the frequency domain occupied bandwidth are used to indicate a frequency domain location. If a plurality of antennas are deployed in the user equipment, the time-frequency resource location identifier may further include a resource identifier or a port identifier occupied by sending of the SRS based on beamforming. It may be learned that regardless of whether the trigger type is beamforming or non-beamforming, for the periodically-sent SRS, the user equipment may determine, based on the time-frequency resource location identifier and the period, the time-frequency resource occupied by each periodically-sent SRS; for the aperiodically-sent SRS, the user equipment may determine, based on the time-frequency resource location identifier, the time-frequency resource occupied by the aperiodically-sent SRS.

Further, it may be understood that in this embodiment of the present disclosure, the SRS determined by using the configuration parameter may be a beamformed SRS that is periodically sent, a beamformed SRS that is aperiodically sent, a non-beamformed SRS that is periodically sent, and a non-beamformed SRS that is aperiodically sent.

102. Obtain a power control parameter of the SRS, and calculate, based on the power control parameter and a preset calculation formula, a transmit power for sending the SRS.

Specifically, the user equipment obtains the power control parameter of the SRS, and calculates, based on the power control parameter and the preset calculation formula, the transmit power for sending the SRS. The power control parameter is sent by the base station. In a feasible solution, the power control parameter is sent by the base station for sending of the SRS. In this case, the base station may send the configuration parameter of the SRS and the power control parameter together to the user equipment. The user equipment obtains the received power control parameter, and calculates, based on the preset calculation formula, the transmit power for sending the SRS. Alternatively, in another feasible solution, the power control parameter is not sent for the SRS, and is sent before the base station sends the configuration parameter of the SRS to the user equipment. The user equipment obtains the previously received power control parameter, and calculates, based on the preset calculation formula, the transmit power for sending the SRS.

Optionally, the power control parameter includes a power offset value of a non-beamformed SRS, a quantity of occupied resource blocks, a power adjustment value, a path loss compensation factor, an expected receive power, and a power gain. The power gain is used to calculate, based on the power offset value of the non-beamformed SRS, a power offset value of an SRS whose trigger type is beamforming. In a feasible solution, the base station may send all the parameters included in the power control parameter separately or by using any combination thereof. After receiving the power control parameter, the user equipment stores the power control parameter.

Further, the preset calculation formula is:

$$P_{SRS} = \min\{P_{CMAX}, P_{SRS\_OFFSET}(m) + 10 \log_{10}(M_{SRS}) + P_O + \alpha \cdot PL + f\},$$

where $P_{SRS}$ is the transmit power for sending the SRS that needs to be obtained through calculation; $P_{CMAX}$ is a preset maximum transmit power in user equipment; $P_{SRS\_OFFSET}(m)$ is a power offset, and values of m are 0, 1, 2, and 3; SRS is the quantity of resource blocks occupied for sending the SRS; $P_O$ is the expected receive power; α is the path loss compensation factor; PL is a path loss estimated by the user equipment; and f is the power adjustment value. Refer to $P_{SRS}$ in 3GPP TS36.213v10.2.0 for specific physical meanings of the parameters other than $P_{SRS\_OFFSET}(m)$.

In this embodiment of the present disclosure, $P_{SRS\_OFFSET}(0)$ is a power offset of a non-beamformed SRS that is periodically sent; $P_{SRS\_OFFSET}(1)$ is a power offset of a non-beamformed SRS that is aperiodically sent; $P_{SRS\_OFFSET}(2)$ is a power offset of a beamformed SRS that is periodically sent; and $P_{SRS\_OFFSET}(0)$ is a power offset of a beamformed SRS that is aperiodically sent.

$P_{SRS\_OFFSET}(0)$ or $P_{SRS\_OFFSET}(1)$ is included in the power control parameter and is sent by the base station, and may be directly determined by the user equipment based on the power control parameter. Calculation manners of $P_{SRS\_OFFSET}(2)$ and $P_{SRS\_OFFSET}(2)$ are:

$$P_{SRS\_OFFSET}(2) = P_{SRS\_OFFSET}(0) - pBF\_SRS\_Gain$$

$$P_{SRS\_OFFSET}(3) = P_{SRS\_OFFSET}(1) - pBF\_SRS\_GainAp$$

where pBF_SRS_Gain is a gain of the beamformed SRS that is periodically sent relative to the non-beamformed SRS that is periodically sent; and pBF_SRS_GainAp is a gain of the beamformed SRS that is aperiodically sent relative to the non-beamformed SRS that is aperiodically sent. The user equipment may determine $P_{SRS\_OFFSET}(2)$ and $P_{SRS\_OFFSET}(3)$ by using the calculation formulas.

103. Send the SRS based on the configuration parameter at the transmit power.

Specifically, the user equipment determines, based on the configuration parameter, the time-frequency resource occupied by the SRS, and sends the SRS on the time-frequency resource at the transmit power.

In this embodiment of the present disclosure, the user equipment receives the configuration parameter of the SRS that is sent by the base station and includes the trigger type, the period parameter, and the time-frequency resource location identifier, and determines, based on the configuration parameter, the time-frequency resource occupied by the SRS; then obtains the power control parameter of the SRS, and calculates, based on the power control parameter and the preset calculation formula, the transmit power for sending the SRS; and finally sends the SRS on the time-frequency resource at the transmit power. The trigger type includes beamforming and non-beamforming, and the SRS may be sent periodically or aperiodically. Compared with the non-beamformed SRS, the beamformed SRS can increase a coverage distance of the SRS, and reduce interference to a neighboring cell, thereby improving effectiveness of sending the SRS.

Figure 3:
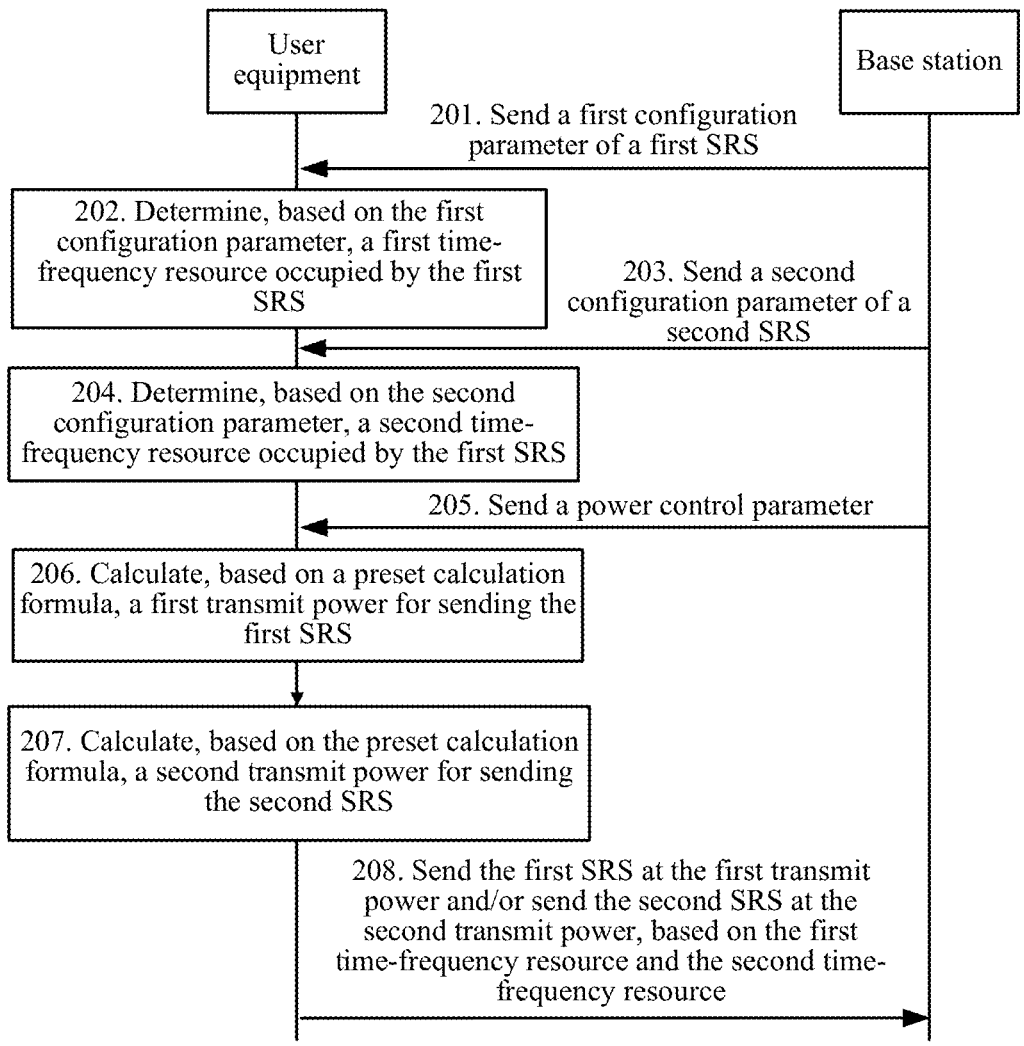
FIG. 3 is a schematic flowchart of another sounding reference signal sending method according to an embodiment of the present disclosure.

FIG. 3 is a schematic flowchart of another sounding reference signal sending method according to an embodiment of the present disclosure. As shown in FIG. 3, the sounding reference signal sending method in this embodiment of the present disclosure includes step 201 to step 208. The sounding reference signal sending method in this embodiment of the present disclosure is considered from a perspective of interaction between user equipment and a base station. The base station may send configuration parameters of a plurality of SRSs to the user equipment, to instruct the user equipment to send the SRSs corresponding to the configuration parameters. In this embodiment of the present disclosure, two SRSs are used as an example. Refer to the following detailed descriptions for a specific process.

201. The base station sends a first configuration parameter of a first SRS to the user equipment.

The base station sends the first configuration parameter of the first SRS to the user equipment. For detailed descriptions of the first configuration parameter, refer to the detailed descriptions of the configuration parameter in the embodiment shown in FIG. 2. Details are not described herein again.

Correspondingly, the user equipment receives the first configuration parameter of the first SRS that is sent by the base station.

202. The user equipment determines, based on the first configuration parameter, a first time-frequency resource occupied by the first SRS.

For a specific process in which the user equipment determines, based on the first configuration parameter, the first time-frequency resource occupied by the first SRS, refer to the detailed descriptions of the time-frequency resource in step 101 in the embodiment shown in FIG. 2. Details are not described herein again.

203. The base station sends a second configuration parameter of a second SRS to the user equipment.

The base station sends the second configuration parameter of the second SRS to the user equipment. For details of the second configuration parameter, refer to the detailed descriptions of the configuration parameter in the embodiment shown in FIG. 2. Details are not described herein again.

Correspondingly, the user equipment receives the second configuration parameter of the second SRS that is sent by the base station.

204. The user equipment determines, based on the second configuration parameter, a second time-frequency resource occupied by the second SRS.

For a specific process in which the user equipment determines, based on the second configuration parameter, the second time-frequency resource occupied by the second SRS, refer to the detailed descriptions of the time-frequency resource in step 101 in the embodiment shown in FIG. 2. Details are not described herein again.

It should be noted that the first configuration parameter or the second configuration parameter is any one of the plurality of the configuration parameters that are sent by the base station to the user equipment. The base station may send a configuration parameter of an SRS to the user equipment once. Therefore, step 201 and step 203 are performed in any sequence.

205. The base station sends a power control parameter to the user equipment.

That the base station sends a power control parameter to the user equipment may be described by using the following two situations.

In a first feasible solution, the power control parameter is sent by the base station for sending of the first SRS or the second SRS. In this case, the base station sends a first power control parameter of the first SRS to the user equipment, and sends a second power control parameter of the second SRS. In this way, the base station may send both the first configuration parameter and the first power control parameter of the first SRS to the user equipment, and send both the second configuration parameter and the second power control parameter of the second SRS to the user equipment.

In a second feasible solution, the power control parameter is not sent for sending of the first SRS or the second SRS, and is sent before the base station sends the first configuration parameter of the first SRS and the second configuration parameter of the second SRS to the user equipment.

Optionally, the power control parameter includes a power offset value of a non-beamformed SRS, a quantity of occupied resource blocks, a power adjustment value, a path loss compensation factor, an expected receive power, and a power gain. The power gain is used to calculate, based on the power offset value of the non-beamformed SRS, a power offset value of an SRS whose trigger type is beamforming. In the second feasible solution, the base station may send all the parameters included in the power control parameter separately or by using any combination thereof.

Correspondingly, the user equipment receives the power control parameter sent by the base station.

206. The user equipment obtains the power control parameter of the first SRS, and calculates, based on the power control parameter of the first SRS and a preset calculation formula, a first transmit power for sending the first SRS.

207. The user equipment obtains the power control parameter of the second SRS, and calculates, based on the power control parameter of the second SRS and a preset calculation formula, a second transmit power for sending the second SRS.

For the preset calculation formula in step 206 and step 207, refer to the detailed descriptions of step 102 in the embodiment shown in FIG. 2. It should be noted that for SRSs of different trigger types that are sent periodically or aperiodically, the user equipment obtains a power control parameter of a corresponding type, and calculates a transmit power of a corresponding SRS based on the preset calculation formula.

For example, if the first SRS is a beamformed SRS that is periodically sent, the power offset value of the non-beamformed SRS, the quantity of occupied resource blocks, the power adjustment value, the path loss compensation factor, the expected receive power, and the power gain are obtained. The power gain is a gain of the beamformed SRS that is periodically sent relative to the non-beamformed SRS that is periodically sent. The first transmit power of the first SRS is calculated based on the obtained power control parameter and the preset calculation formula.

208. The user equipment sends the first SRS at the first transmit power and/or sends the second SRS at the second transmit power, based on the first time-frequency resource and the second time-frequency resource.

Specifically, a specific process in which the user equipment sends the first SRS at the first transmit power and/or sends the second SRS at the second transmit power, based on the first time-frequency resource and the second time-frequency resource is described in the following manners.

In a first manner, a priority rule may be preset. An optional priority rule is: a priority of an SRS of any trigger type that is aperiodically sent is higher than a priority of an SRS of any trigger type that is periodically sent; a priority of a beamformed SRS that is periodically sent is higher than a priority of a non-beamformed SRS that is periodically sent; and a priority of a beamformed SRS that is aperiodically sent is higher than a priority of a non-beamformed SRS that is aperiodically sent. According to the priority rule, if the first SRS and the second SRS occupy a same time-frequency resource, the first SRS is sent at the first transmit power or the second SRS is sent at the second transmit power, according to the preset priority rule; if the first SRS and the second SRS occupy different time-frequency resources, the first SRS is sent at the first transmit power and the second SRS is sent at the second transmit power.

For example, when the first SRS is a beamformed SRS that is periodically sent, and the second SRS is a beamformed SRS that is aperiodically sent, if the first SRS and the second SRS occupy a same time-frequency resource, the second SRS is sent on the same occupied time-frequency resource at the second transmit power; or when the first SRS is a non-beamformed SRS that is periodically sent, and the second SRS is a non-beamformed SRS that is aperiodically sent, if the first SRS and the second SRS occupy a same time-frequency resource, the second SRS is sent on the same occupied time-frequency resource at the second transmit power.

In a second manner, when the first SRS is a beamformed SRS that is periodically sent, and the second SRS is a beamformed SRS that is aperiodically sent, if the first SRS and the second SRS occupy a same time-frequency resource, the second SRS is sent on the same occupied time-frequency resource at the second transmit power.

Figure 4A:
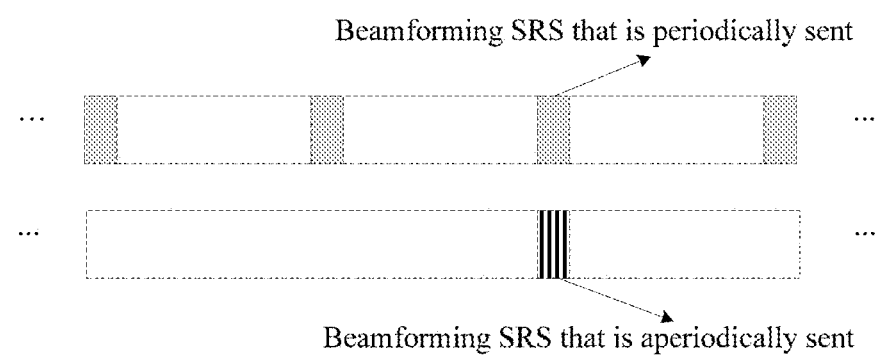
FIG. 4a is a schematic diagram of an example according to an embodiment of the present disclosure.
Figure 4B:
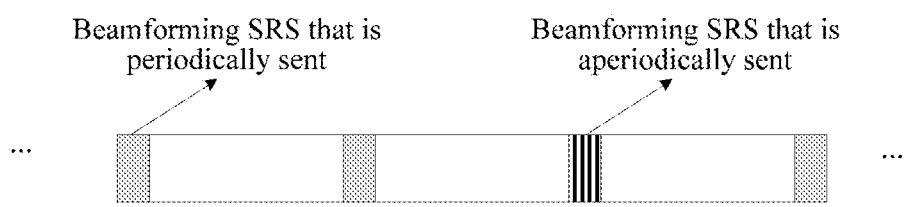
FIG. 4b is a schematic diagram of an example according to an embodiment of the present disclosure.

FIG. 4a and FIG. 4b are schematic diagrams of an example according to an embodiment of the present disclosure. In FIG. 4a, the first SRS is a beamformed SRS that is periodically sent, and the second SRS is a beamformed SRS that is aperiodically sent. It may be learned from FIG. 4a that the first time-frequency resource occupied by the first SRS and the second time-frequency resource occupied by the second SRS have a same time-frequency resource. It may be learned from FIG. 4b that the user equipment sends the beamformed SRS that is aperiodically sent, namely, the second SRS, on the time-frequency resource.

It may be understood that if the first SRS and the second SRS occupy different time-frequency resources, the first SRS is sent at the first transmit power and the second SRS is sent at the second transmit power.

In a third manner, when the first SRS is a beamformed SRS that is periodically sent, the second SRS is a non-beamformed SRS that is periodically sent, and the second SRS and the first SRS have a same period, if the first SRS and the second SRS occupy a same time-frequency resource, the same time-frequency resource is divided into a first same time-frequency resource and a second same time-frequency resource, the first SRS is sent on the first same time-frequency resource at the first transmit power, and the second SRS is sent on the second same time-frequency resource at the second transmit power; or the first SRS is sent on the same time-frequency resource at the first transmit power.

Division of the first same time-frequency resource and the second same time-frequency resource may be performed by the user equipment randomly or according to a rule. For example, because the first SRS and the second SRS are periodically sent and have a same period, they have a plurality of same time-frequency resources. The user equipment classifies the $(2i-1)^{th}$ same time-frequency resource as the first same time-frequency resource, and classifies the $(2i)^{th}$ same time-frequency resource as the second same time-frequency resource, where i is a positive integer greater than or equal to 1. After such division, the user equipment may alternately send the first SRS and the second SRS. It may be understood that such division is only an example, and another division manner is not limited in this embodiment of the present disclosure.

Figure 5A:
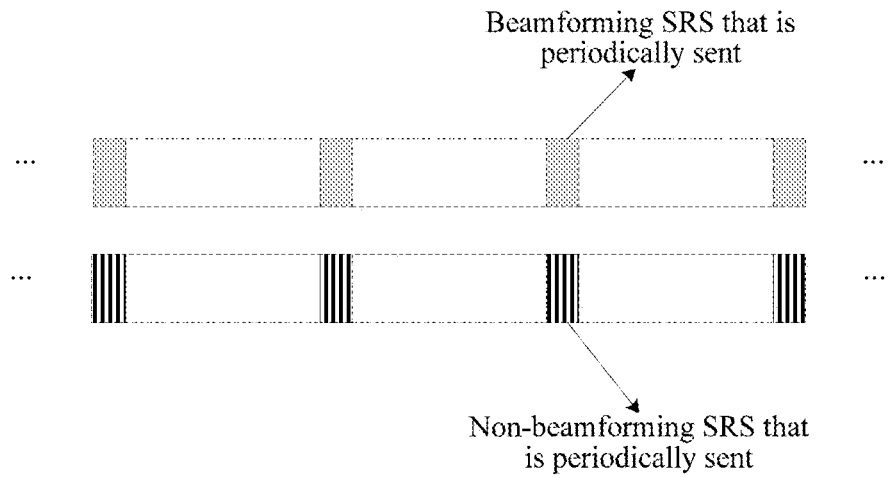
FIG. 5a is a schematic diagram of an example according to an embodiment of the present disclosure.
Figure 5B:
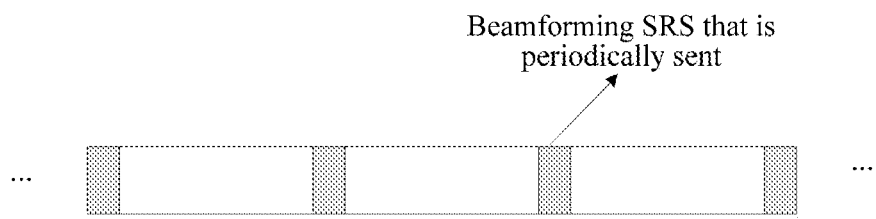
FIG. 5b is a schematic diagram of an example according to an embodiment of the present disclosure.
Figure 5C:
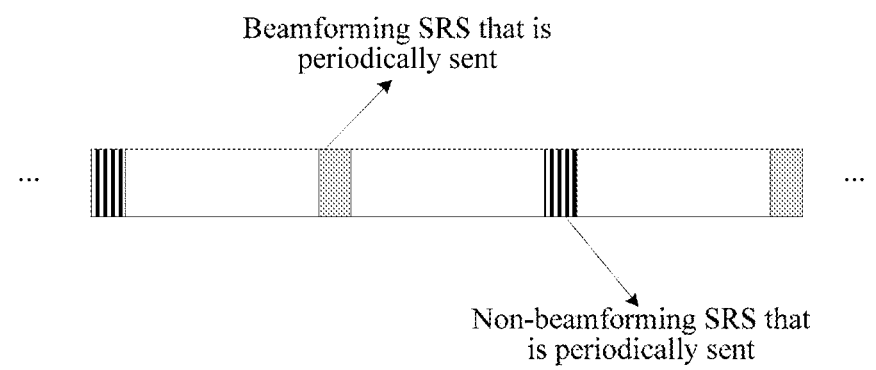
FIG. 5c is a schematic diagram of an example according to an embodiment of the present disclosure.

FIG. 5a, FIG. 5b, and FIG. 5c are schematic diagrams of another example according to an embodiment of the present disclosure. In FIG. 5a, the first SRS is a beamformed SRS that is periodically sent, and the second SRS is a non-beamformed SRS that is periodically sent. It may be learned from FIG. 5a that the first SRS and the second SRS have a same period, and the first time-frequency resource occupied by the first SRS is the same as the second time-frequency resource occupied by the second SRS. A manner is that it is learned from FIG. 5b that the user equipment periodically sends the beamformed SRS, namely, the first SRS, on the same time-frequency resources. Another manner is that the user equipment divides the same time-frequency resources into the first time-frequency resource and the second time-frequency resource, to alternately send the first SRS and the second SRS.

It may be understood that if the first SRS and the second SRS occupy different time-frequency resources, the first SRS is sent at the first transmit power and the second SRS is sent at the second transmit power.

In a fourth manner, when the first SRS is a beamformed SRS that is periodically sent, and the second SRS is a non-beamformed SRS that is periodically sent, and the second SRS and the first SRS have different periods, if the first SRS and the second SRS occupy a same time-frequency resource, the first SRS is sent on the same occupied time-frequency resource at the first transmit power.

Because a beamformed SRS that is periodically sent and a non-beamformed SRS that is periodically sent that have different periods may also occupy a same time-frequency resource, for example, one period is m times the another period, and m is a positive integer greater than 1, in this case, the first time-frequency resource occupied by the first SRS and the second time-frequency resource occupied by the second SRS form an inclusion relationship. For another example, the two periods have no integer multiple relationship, in a common multiple period of the two periods, the first SRS and the second SRS may occupy a same time-frequency resource.

Figure 6A:
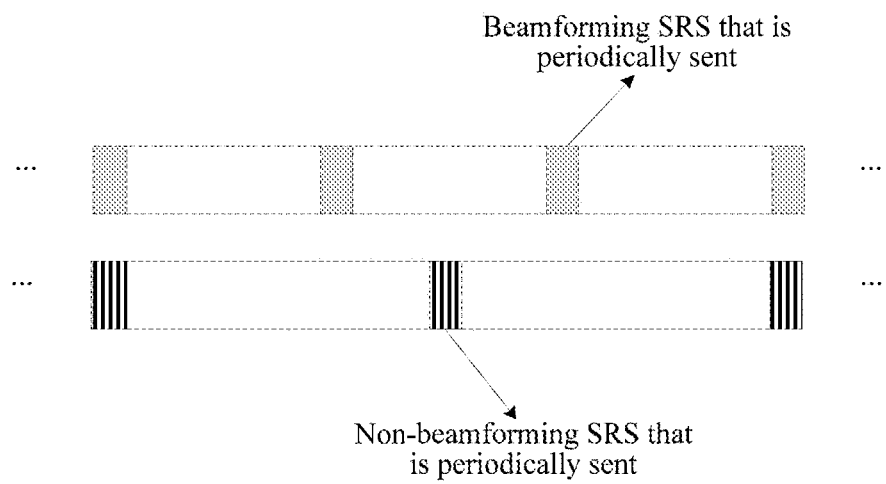
FIG. 6a is a schematic diagram of an example according to an embodiment of the present disclosure.
Figure 6B:
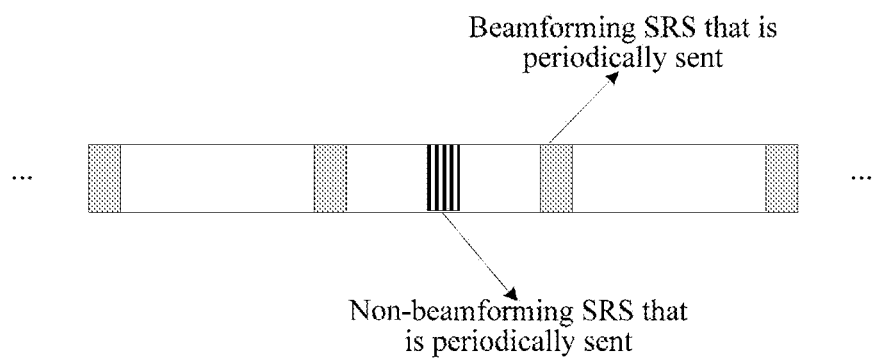
FIG. 6b is a schematic diagram of an example according to an embodiment of the present disclosure.

In this case, FIG. 6a and FIG. 6b are schematic diagrams of an example according to an embodiment of the present disclosure. In FIG. 6a, the first SRS is a beamformed SRS that is periodically sent, and the second SRS is a non-beamformed SRS that is periodically sent. It may be learned from FIG. 6a that the first SRS and the second SRS have different periods, and the first time-frequency resource occupied by the first SRS and the second time-frequency resource occupied by the second SRS have a same time-frequency resource. It may be learned from FIG. 6b that the user equipment sends the first SRS on the time-frequency resource. It may be understood that if the first SRS and the second SRS occupy different time-frequency resources, the first SRS is sent at the first transmit power and the second SRS is sent at the second transmit power.

In a fifth manner, when the first SRS is a beamformed SRS that is periodically sent, and the second SRS is a non-beamformed SRS that is aperiodically sent, if the first SRS and the second SRS occupy a same time-frequency resource, the second SRS is sent on the same time-frequency resource at the second transmit power; if the first SRS and the second SRS occupy different time-frequency resources, the first SRS is sent at the first transmit power and the second SRS is sent at the second transmit power.

In a sixth manner, when the first SRS is a beamformed SRS that is aperiodically sent, and the second SRS is a non-beamformed SRS that is aperiodically sent, if the first SRS and the second SRS occupy a same time-frequency resource, the first SRS is sent on the same time-frequency resource at the first transmit power; if the first SRS and the second SRS occupy different time-frequency resources, the first SRS is sent at the first transmit power and the second SRS is sent at the second transmit power.

In a seventh manner, when the first SRS is a beamformed SRS that is aperiodically sent, and the second SRS is a non-beamformed SRS that is periodically sent, if the first SRS and the second SRS occupy a same time-frequency resource, the first SRS is sent on the same time-frequency resource at the first transmit power; if the first SRS and the second SRS occupy different time-frequency resources, the first SRS is sent at the first transmit power and the second SRS is sent at the second transmit power.

In an eighth manner, when the first SRS is a non-beamformed SRS that is periodically sent, and the second SRS is a non-beamformed SRS that is aperiodically sent, if the first SRS and the second SRS occupy a same time-frequency resource, the second SRS is sent on the same time-frequency resource at the second transmit power; if the first SRS and the second SRS occupy different time-frequency resources, the first SRS is sent at the first transmit power and the second SRS is sent at the second transmit power.

In this embodiment of the present disclosure, the user equipment receives the configuration parameter of the SRS that is sent by the base station and includes the trigger type, the period parameter, and the time-frequency resource location identifier, and determines, based on the configuration parameter, the time-frequency resource occupied by the SRS; then obtains the power control parameter of the SRS, and calculates, based on the power control parameter and the preset calculation formula, the transmit power for sending the SRS; and finally sends the SRS on the time-frequency resource at the transmit power. The trigger type includes beamforming and non-beamforming, and the SRS may be sent periodically or aperiodically. Compared with the non-beamformed SRS, the beamformed SRS can increase a coverage distance of the SRS, and reduce interference to a neighboring cell, thereby improving effectiveness of sending the SRS.

Figure 7:
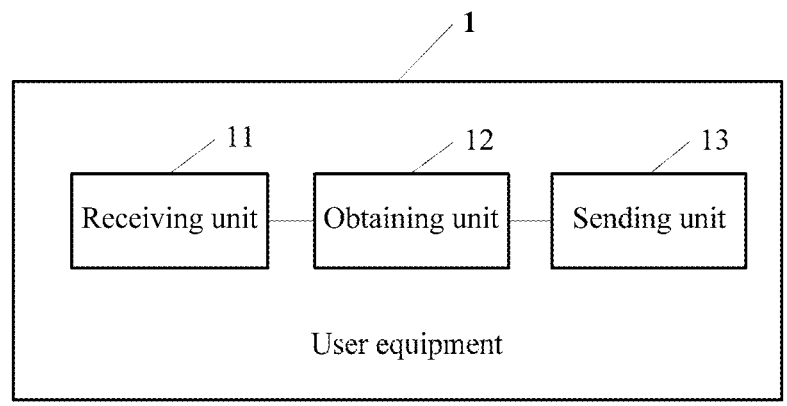
FIG. 7 is a schematic modular diagram of user equipment according to an embodiment of the present disclosure.

FIG. 7 is a schematic modular diagram of user equipment according to an embodiment of the present disclosure. The user equipment in this embodiment of the present disclosure may be any user equipment provided in the embodiments of FIG. 2 to FIG. 6. As shown in FIG. 7, the user equipment 1 in this embodiment of the present disclosure may include: a receiving unit 11, an obtaining unit 12, and a sending unit 13.

The receiving unit 11 is configured to: receive a configuration parameter, sent by a base station, of a sounding reference signal SRS, and determine, based on the configuration parameter, a time-frequency resource occupied by the SRS, where the configuration parameter includes a trigger type, a period parameter, and a time-frequency resource location identifier.

The obtaining unit 12 is configured to: obtain a power control parameter of the SRS, and calculate, based on the power control parameter and a preset calculation formula, a transmit power for sending the SRS.

The sending unit 13 is configured to send the SRS on the time-frequency resource at the transmit power.

The trigger type includes beamforming or non-beamforming; and the period parameter is an identifier used to indicate that the SRS is sent periodically or aperiodically.

Optionally, the SRS includes a first SRS and a second SRS; a configuration parameter of the first SRS is a first configuration parameter, a configuration parameter of the second SRS is a second configuration parameter, a transmit power of the first SRS is a first transmit power, and a transmit power of the second SRS is a second transmit power.

Optionally, the sending unit 13 is specifically configured to:

if the first SRS and the second SRS occupy a same time-frequency resource, according to a preset priority rule, send the first SRS at the first transmit power or send the second SRS at the second transmit power; or if the first SRS and the second SRS occupy different time-frequency resources, send the first SRS at the first transmit power and send the second SRS at the second transmit power.

Optionally, the preset priority rule includes:

a priority of an SRS of any trigger type that is aperiodically sent is higher than a priority of an SRS of any trigger type that is periodically sent;

a priority of a beamformed SRS that is periodically sent is higher than a priority of a non-beamformed SRS that is periodically sent; and a priority of a beamformed SRS that is aperiodically sent is higher than a priority of a non-beamformed SRS that is aperiodically sent.

Optionally, when the first SRS is a beamformed SRS that is periodically sent, and the second SRS is a beamformed SRS that is aperiodically sent, the sending unit 13 is specifically configured to:

if the first SRS and the second SRS occupy a same time-frequency resource, send the second SRS on the same occupied time-frequency resource at the second transmit power; or if the first SRS and the second SRS occupy different time-frequency resources, send the first SRS at the first transmit power and send the second SRS at the second transmit power.

Optionally, when the first SRS is a beamformed SRS that is periodically sent, and the second SRS is a non-beamformed SRS that is periodically sent, and the second SRS and the first SRS have a same period, the sending unit 13 is specifically configured to:

if the first SRS and the second SRS occupy a same time-frequency resource, divide the same time-frequency resource into a first same time-frequency resource and a second same time-frequency resource, send the first SRS on the first same time-frequency resource at the first transmit power, and send the second SRS on the second same time-frequency resource at the second transmit power; or send the first SRS on the same time-frequency resource at the first transmit power; or if the first SRS and the second SRS occupy different time-frequency resources, send the first SRS at the first transmit power and send the second SRS at the second transmit power.

Optionally, when the first SRS is a beamformed SRS that is periodically sent, and the second SRS is a non-beamformed SRS that is periodically sent, and the second SRS and the first SRS have different periods, the sending unit 13 is specifically configured to:

if the first SRS and the second SRS occupy a same time-frequency resource, send the first SRS on the same occupied time-frequency resource at the first transmit power; or if the first SRS and the second SRS occupy different time-frequency resources, send the first SRS at the first transmit power and send the second SRS at the second transmit power.

Optionally, the power control parameter includes a power offset value of a non-beamformed SRS, a quantity of occupied resource blocks, a power adjustment value, a path loss compensation factor, an expected receive power, and a power gain. The power gain is used to calculate, based on the power offset value of the non-beamformed SRS, a power offset value of an SRS whose trigger type is beamforming.

Optionally, the preset calculation formula is:

$$P_{SRS}=\min\{P_{CMAX}, P_{SRS\_OFFSET}(m)+10\log_{10}(M_{SRS})+P_O+\alpha \cdot PL+f\},$$

where $P_{SRS}$ is the transmit power for sending the SRS; $P_{CMAX}$ is a preset maximum transmit power in user equipment; $P_{SRS\_OFFSET}(m)$ is a power offset, and values of m are 0, 1, 2, and 3; $M_{SRS}$ is the quantity of resource blocks occupied for sending the SRS; $P_O$ is the expected receive power; α is the path loss compensation factor; PL is a path loss estimated by the user equipment; and f is the power adjustment value;

$P_{SRS\_OFFSET}(0)$ is a power offset of a non-beamformed SRS that is periodically sent; $P_{SRS\_OFFSET}(1)$ is a power offset of a non-beamformed SRS that is aperiodically sent; Pd SRS that is periodically sent; and $P_{SRS\_OFFSET}(3)$ is a power offset of a beamformed SRS that is aperiodically sent; and calculation manners of $P_{SRS\_OFFSET}(2)$ and $P_{SRS\_OFFSET}(3)$ are:

$$P_{SRS\_OFFSET}(2)=P_{SRS\_OFFSET}(0)-pBF\_SRS\_Gain$$

$$P_{SRS\_OFFSET}(3)=P_{SRS\_OFFSET}(1)-pBF\_SRS\_GainAp$$

where pBF_SRS_Gain is a gain of the beamformed SRS that is periodically sent relative to the non-beamformed SRS that is periodically sent; and pBF_SRS_GainAp is a gain of the beamformed SRS that is aperiodically sent relative to the non-beamformed SRS that is aperiodically sent.

It should be noted that in the user equipment in the embodiment shown in FIG. 7, refer to the specific descriptions of corresponding method embodiments in FIG. 2 to FIG. 6 for specific implementations and technical effects of the functional units. Details are not described herein again.

Figure 8:
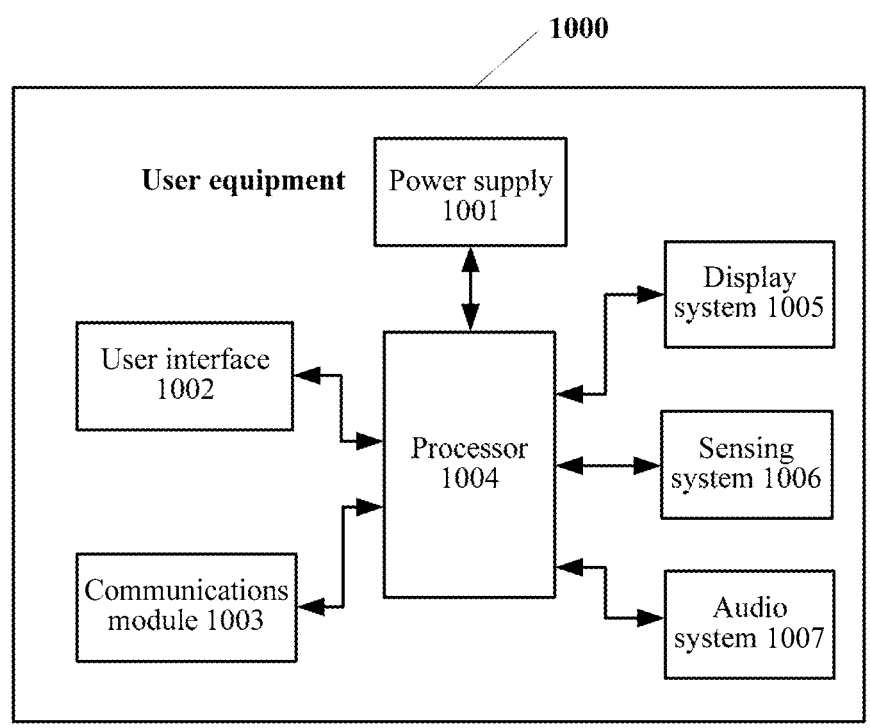
FIG. 8 is a schematic structural diagram of user equipment according to an embodiment of the present disclosure.

The user equipment in the embodiment shown in FIG. 7 may be implemented by using user equipment shown in FIG. 8. FIG. 8 is a schematic structural diagram of user equipment according to an embodiment of the present invention. The user equipment 1000 shown in FIG. 8 includes: a power supply 1001, a user interface 1002, a communications module 1003, a processor 1004, a display system 1005, a sensing system 1006, and an audio system 1007. A structure of the user equipment shown in FIG. 8 does not constitute limitation to the embodiments of the present disclosure.

The power supply 1001 provides power security for implementation of each function of the user equipment 1000. The user interface 1002 is configured to connect the user equipment 1000 to another device or apparatus, to implement communication or data transmission between the another device or apparatus and the user equipment 1000. The communications module 1003 is configured to implement communication or data transmission between the user equipment 1000 and a network side device such as a base station or a satellite, and is further configured to implement the communication or data transmission between the user equipment 1000 and the another user equipment. The processor 1004 may implement or execute various examples of logical blocks, modules, and circuits that are described with reference to the contents disclosed in the present invention. The display system 1005 is configured to: output and display information and receive an entry operation of a user. The sensing system 1006 includes various sensors, for example, a temperature sensor and a distance sensor. The audio system 1007 is configured to output an audio signal.

The user equipment is applied to this embodiment of the present disclosure, the processor 1003 is configured to implement a function of the obtaining unit 12 in FIG. 7, and correspondingly, the communications module 1003 is configured to implement functions of the receiving unit 11 and the sending unit 13.

An embodiment of the present invention further provides a computer storage medium, configured to store a computer software instruction used by the foregoing user equipment. The computer software instruction includes a program designed for the user equipment to perform the foregoing aspects, to implement an action of the user equipment in any embodiment shown in FIG. 2 to FIG. 6.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are embodiments as an example, and the related actions and modules are not necessarily mandatory to the present disclosure.

In the foregoing embodiments, the descriptions of the embodiments have respective focuses. For a part that is not described in detail in an embodiment, reference may be made to related descriptions in other embodiments.

Steps in the method in the embodiments of the present disclosure may be adjusted, combined, or deleted according to an actual requirement.

Units in the apparatus in the embodiments of the present disclosure may be adjusted, combined, or deleted according to an actual requirement. A person skilled in the art may integrate or combine different embodiments and characteristics of different embodiments described in this specification.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a random access memory (Random Access Memory, RAM), a read-only memory (Read-Only Memory, ROM), an electrically erasable programmable read-only memory (Electrically Erasable Programmable Read-Only Memory, EEPROM), a compact disc read-only memory (Compact Disc Read-Only Memory, CD-ROM) or other optical disc storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (Digital Subscriber Line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what are described above are merely examples of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A sounding reference signal sending method, comprising:

receiving a configuration parameter of a sounding reference signal (SRS) from a base station, and determining, based on the configuration parameter, a time-frequency resource occupied by the SRS, wherein the configuration parameter comprises a trigger type, a period parameter, and a time-frequency resource location identifier;

obtaining a power control parameter of the SRS, and calculating, based on the power control parameter and a preset calculation formula, a transmit power for sending the SRS; and sending the SRS on the time-frequency resource at the transmit power, wherein the trigger type comprises beamforming or non-beamforming; and the period parameter is an identifier used to indicate that the SRS is sent periodically or aperiodically.

2. The method according to claim 1, wherein the SRS comprises a first SRS and a second SRS; a configuration parameter of the first SRS is a first configuration parameter, a configuration parameter of the second SRS is a second configuration parameter, a transmit power of the first SRS is a first transmit power, and a transmit power of the second SRS is a second transmit power.

3. The method according to claim 2 wherein the sending the SRS on the time-frequency resource at the transmit power comprises:
- if the first SRS and the second SRS occupy a same time-frequency resource, according to a preset priority rule, sending the first SRS at the first transmit power or sending the second SRS at the second transmit power; or
- if the first SRS and the second SRS occupy different time-frequency resources, sending the first SRS at the first transmit power and sending the second SRS at the second transmit power.

4. The method according to claim 3, wherein the preset priority rule comprises:
- a priority of an SRS of any trigger type that is aperiodically sent is higher than a priority of an SRS of any trigger type that is periodically sent;
- a priority of a beamformed SRS that is periodically sent is higher than a priority of a non-beamformed SRS that is periodically sent; and
- a priority of a beamformed SRS that is aperiodically sent is higher than a priority of a non-beamformed SRS that is aperiodically sent.

5. The method according to claim 2, wherein when the first SRS is a beamformed SRS that is periodically sent, and the second SRS is a beamformed SRS that is aperiodically sent, the sending the SRS on the time-frequency resource at the transmit power comprises:
- if the first SRS and the second SRS occupy a same time-frequency resource, sending the second SRS on the same occupied time-frequency resource at the second transmit power; or
- if the first SRS and the second SRS occupy different time-frequency resources, sending the first SRS at the first transmit power and sending the second SRS at the second transmit power.

6. The method according to claim 2, wherein when the first SRS is a beamformed SRS that is periodically sent, the second SRS is a non-beamformed SRS that is periodically sent, and the second SRS and the first SRS have a same period, the sending the SRS on the time-frequency resource at the transmit power comprises:
- if the first SRS and the second SRS occupy a same time-frequency resource, dividing the same time-frequency resource into a first same time-frequency resource and a second same time-frequency resource, sending the first SRS on the first same time-frequency resource at the first transmit power, and sending the second SRS on the second same time-frequency resource at the second transmit power; or sending the first SRS on the same time-frequency resource at the first transmit power; or
- if the first SRS and the second SRS occupy different time-frequency resources, sending the first SRS at the first transmit power and sending the second SRS at the second transmit power.

7. The method according to claim 2, wherein when the first SRS is a beamformed SRS that is periodically sent, the second SRS is a non-beamformed SRS that is periodically sent, and the second SRS and the first SRS have different periods, the sending the SRS on the time-frequency resource at the transmit power comprises:
- if the first SRS and the second SRS occupy a same time-frequency resource, sending the first SRS on the same occupied time-frequency resource at the first transmit power; or
- if the first SRS and the second SRS occupy different time-frequency resources, sending the first SRS at the first transmit power and sending the second SRS at the second transmit power.

8. The method claim 1, wherein the power control parameter comprises a power offset value of a non-beamformed SRS, a quantity of occupied resource blocks, a power adjustment value, a path loss compensation factor, an expected receive power, and a power gain, and the power gain is used to calculate, based on the power offset value of the non-beamformed SRS, a power offset value of an SRS whose trigger type is beamforming.

9. The method according to claim 8, wherein the preset calculation formula is:

$$P_{SRS}=\min\{P_{CMAX}, P_{SRS\_OFFSET}(m)+10\log_{10}(M_{SRS})+P_O+\alpha\cdot PL+f\},$$

wherein $P_{SRS}$ is the transmit power for sending the SRS; $P_{CMAX}$ is a preset maximum transmit power in user equipment; $P_{SRS\_OFFSET}(m)$ is a power offset, and values of m are 0, 1, 2, and 3; $M_{SRS}$ is the quantity of resource blocks occupied for sending the SRS; $P_O$ is the expected receive power; $\alpha$ is the path loss compensation factor; PL is a path loss estimated by the user equipment; and f is the power adjustment value;

$P_{SRS\_OFFSET}(0)$ is a power offset of a non-beamformed SRS that is periodically sent; $P_{SRS\_OFFSET}(1)$ is a power offset of a non-beamformed SRS that is aperiodically sent; $P_{SRS\_OFFSET}(2)$ is a power offset of a beamformed SRS that is periodically sent; and $P_{SRS\_OFFSET}(3)$ is a power offset of a beamformed SRS that is aperiodically sent; and calculation manners of $P_{SRS\_OFFSET}(2)$ and $P_{SRS\_OFFSET}(3)$ are:

$$P_{SRS\_OFFSET}(2)=P_{SRS\_OFFSET}(0)-pBF\_SRS\_Gain,$$

$$P_{SRS\_OFFSET}(3)=P_{SRS\_OFFSET}(1)-pBF\_SRS\_GainAp,$$

wherein pBF_SRS_Gain is a gain of the beamformed SRS that is periodically sent relative to the non-beamformed SRS that is periodically sent; and pBF_SRS_GainAp is a gain of the beamformed SRS that is aperiodically sent relative to the non-beamformed SRS that is aperiodically sent.

10. An apparatus comprising a processor and a transceiver, wherein the processor is configured to cooperate with transceiver to cause the apparatus to perform the steps of:
- receiving a configuration parameter of a sounding reference signal (SRS) from a base station, and determining, based on the configuration parameter, a time-frequency resource occupied by the SRS, wherein the configuration parameter comprises a trigger type a period parameter, and a time-frequency resource location identifier;
- obtaining a power control parameter of the SRS, and calculating, based on the power control parameter and a preset calculation formula, a transmit power for sending the SRS; and
- sending the SRS on the time-frequency resource at the transmit power, wherein
- the trigger type comprises beamforming or non-beamforming; and the period parameter is an identifier used to indicate that the SRS is sent periodically or aperiodically.

11. The apparatus according to claim 10, wherein the SRS comprises a first SRS and a second SRS; a configuration parameter of the first SRS is a first configuration parameter, a configuration parameter of the second SRS is a second configuration parameter, a transmit power of the first SRS is a first transmit power, and a transmit power of the second SRS is a second transmit power.

12. The apparatus according to claim 11, wherein the sending the SRS on the time-frequency resource at the transmit power, the processor is specifically configured to cooperate with transceiver to cause the apparatus to perform the steps of:
    if the first SRS and the second SRS occupy a same time-frequency resource, according to a preset priority rule, sending the first SRS at the first transmit power or sending the second SRS at the second transmit power; or
    if the first SRS and the second SRS occupy different time-frequency resources, sending the first SRS at the first transmit power and sending the second SRS at the second transmit power.

13. The apparatus according to claim 12, wherein the preset priority rule comprises:
    a priority of an SRS of any trigger type that is aperiodically sent is higher than a priority of an SRS of any trigger type that is periodically sent;
    a priority of a beamformed SRS that is periodically sent is higher than a priority of a non-beamformed SRS that is periodically sent; and
    a priority of a beamformed SRS that is aperiodically sent is higher than a priority of a non-beamformed SRS that is aperiodically sent.

14. The apparatus according to claim 11, wherein when the first SRS is a beamformed SRS that is periodically sent, and the second SRS is a beamformed SRS that is aperiodically sent, wherein the sending the SRS on the time-frequency resource at the transmit power, the processor is specifically configured to cooperate with transceiver to cause the apparatus to perform the steps of:
    if the first SRS and the second SRS occupy a same time-frequency resource, sending the second SRS on the same occupied time-frequency resource at the second transmit power; or
    if the first SRS and the second SRS occupy different time-frequency resources, sending the first SRS at the first transmit power and sending the second SRS at the second transmit power.

15. The apparatus according to claim 11, wherein when the first SRS is a beamformed SRS that is periodically sent, the second SRS is a non-beamformed SRS that is periodically sent, and wherein the second SRS and the first SRS have a same period, the sending the SRS on the time-frequency resource at the transmit power, the processor is specifically configured to cooperate with transceiver to cause the apparatus to perform the steps of:
    if the first SRS and the second SRS occupy a same time-frequency resource, dividing the same time-frequency resource into a first same time-frequency resource and a second same time-frequency resource, sending the first SRS on the first same time-frequency resource at the first transmit power, and sending the second SRS on the second same time-frequency resource at the second transmit power; or sending the first SRS on the same time-frequency resource at the first transmit power; or
    if the first SRS and the second SRS occupy different time-frequency resources, sending the first SRS at the first transmit power and sending the second SRS at the second transmit power.

16. The apparatus according to claim 11, wherein when the first SRS is a beamformed SRS that is periodically sent, the second SRS is a non-beamformed SRS that is periodically sent, and the second SRS and the first SRS have different periods, wherein the sending the SRS on the time-frequency resource at the transmit power comprises:
    if the first SRS and the second SRS occupy a same time-frequency resource, sending the first SRS on the same occupied time-frequency resource at the first transmit power; or
    if the first SRS and the second SRS occupy different time-frequency resources, sending the first SRS at the first transmit power and sending the second SRS at the second transmit power.

17. The apparatus according to claim 10, wherein the power control parameter comprises a power offset value of a non-beamformed SRS, a quantity of occupied resource blocks, a power adjustment value, a path loss compensation factor, an expected receive power, and a power gain, and the power gain is used to calculate, based on the power offset value of the non-beamformed SRS, a power offset value of an SRS whose trigger type is beamforming.

18. The apparatus according to claim 17, wherein the preset calculation formula is:

$$P_{SRS}=\min\{P_{CMAX}, P_{SRS\_OFFSET}(m)=10\log_{10}(M_{SRS})+P_O+\alpha\cdot PL+F\},$$

wherein $P_{SRS}$ is the transmit power for sending the SRS; $P_{CMAX}$ is a preset maximum transmit power in user equipment; $P_{SRS\_OFFSET}(m)$ is a power offset, and values of m are 0, 1, 2, and 3; $M_{SRS}$ is the quantity of resource blocks occupied for sending the SRS; $P_O$ is the expected receive power; $\alpha$ is the path loss compensation factor; PL is a path loss estimated by the user equipment; and f is the power adjustment value;

$P_{SRS\_OFFSET}(0)$ is a power offset of a non-beamformed SRS that is periodically sent; $P_{SRS\_OFFSET}(1)$ is a power offset of a non-beamformed SRS that is aperiodically sent; $P_{SRS\_OFFSET}(2)$ is a power offset of a beamformed SRS that is periodically sent; and $P_{SRS\_OFFSET}(3)$ is a power offset of a beamformed SRS that is aperiodically sent; and calculation manners of $P_{SRS\_OFFSET}(2)$ and $P_{SRS\_OFFSET}(3)$ are:

$$P_{SRS\_OFFSET}(2)=P_{SRS\_OFFSET}(0)-pBF\_SRS\_Gain,$$

$$P_{SRS\_OFFSET}(3)=P_{SRS\_OFFSET}(1)-pBF\_SRS\_GainAp,$$

wherein pBF_SRS_Gain is a gain of the beamformed SRS that is periodically sent relative to the non-beamformed SRS that is periodically sent; and pBF_SRS_GainAp is a gain of the beamformed SRS that is aperiodically sent relative to the non-beamformed SRS that is aperiodically sent.

19. A device in the telecommunications network, comprising:
    a transceiver that supports communications in the telecommunications network;
    a processor operably coupled to the transceiver; and
    wherein the transceiver and the processor cooperatively operate to cause the UE to carry out the steps of the method of:
    receiving a configuration parameter of a sounding reference signal (SRS) from a base station, and determining, based on the configuration parameter, a time-frequency resource occupied by the SRS, wherein the configuration parameter comprises a trigger type, a period parameter, and a time-frequency resource location identifier;

obtaining a power control parameter of the SRS, and calculating, based on the power control parameter and a preset calculation formula, a transmit power for sending the SRS; and sending the SRS on the time-frequency resource at the transmit power, wherein the trigger type comprises beamforming or non-beamforming; and the period parameter is an identifier used to indicate that the SRS is sent periodically or aperiodically.

20. The device according to claim 19, wherein the SRS comprises a first SRS and a second SRS; a configuration parameter of the first SRS is a first configuration parameter, a configuration parameter of the second SRS is a second configuration parameter, a transmit power of the first SRS is a first transmit power, and a transmit power of the second SRS is a second transmit power.

* * * * *